Dec. 28, 1954    D. L. WENHAM    2,697,944
LIQUID FLOW INDICATOR

Filed Dec. 28, 1949    2 Sheets-Sheet 1

INVENTOR.
DOUGLAS LEE WENHAM
BY
Young, Emery & Thompson
Attys.

Dec. 28, 1954  D. L. WENHAM  2,697,944
LIQUID FLOW INDICATOR
Filed Dec. 28, 1949  2 Sheets-Sheet 2

INVENTOR.
DOUGLAS LEE WENHAM
BY
Young, Emery & Thompson
Attys.

United States Patent Office 2,697,944
Patented Dec. 28, 1954

2,697,944

LIQUID FLOW INDICATOR

Douglas L. Wenham, Hamilton, New Zealand

Application December 28, 1949, Serial No. 135,437

Claims priority, application New Zealand
January 19, 1949

6 Claims. (Cl. 73—216)

This invention relates to a liquid flow indicator adapted to be interposed in a passageway for the passage of a frothy liquid under a degree of reduced pressure. The invention is particularly though not solely applicable to an indicator for indicating the flow of milk or the like in a system under vacuum, for example a milking machine, in which case the indicator is employed between a claw and the main milk line and serves to indicate when the milk flow from each cow falls off to the point where the cups should be removed, which saves time and increases the efficiency of the plant.

The object of the invention is to provide effective means for indicating the state of flow of the liquid in question.

In a normal type of milking machine, milk mixed with air enters the main milk line by way of the cup, claw and downdropper tube, and this milk-air mixture flows unevenly due to the following causes.

(a) Variations in the flow of milk from the cow.
(b) The effect of the pulsations in the machine.
(c) In some cases milk accumulates in the downdropper tube until there is enough to be carried up the required height to the milk line.
(d) Variations in the amount of air, due to leaks in the system and other causes.

The pulsating, uneven flow of the mixture of milk and froth makes it difficult to indicate the rate of flow of the milk from the cow and to indicate when for practical purposes the flow of milk from each cow can be considered to be so low that the cups should be removed. It is an object of this invention to overcome the above defects.

The invention consists in a liquid flow indicator adapted to be interposed in a passageway for the passage of a frothy liquid under a degree of reduced pressure, said indicator being provided with means to separate and substantially free from froth a desired portion of the liquid passing through the indicator and means for utilising said separated portion to indicate visually the state of flow through the indicator.

Figure 1:
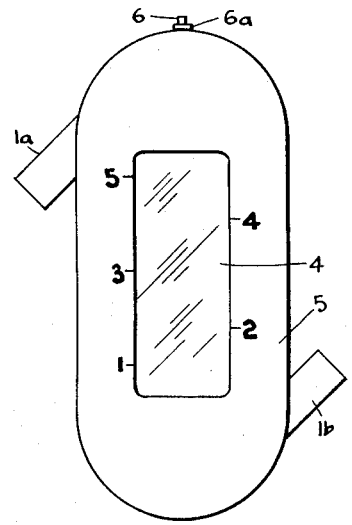
Figure 2:
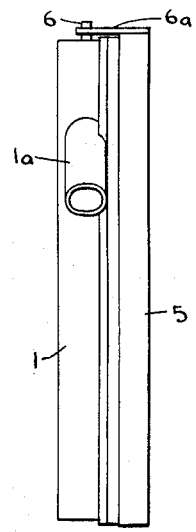
Figure 3:
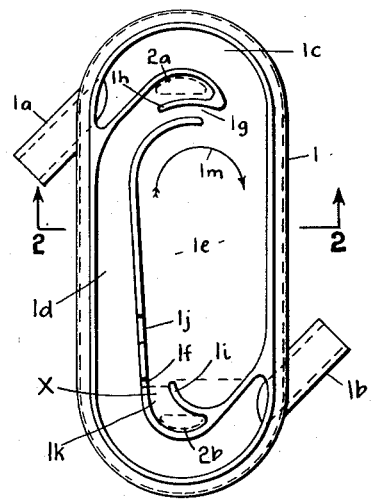
Figure 4:
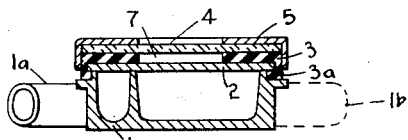
Figure 5:
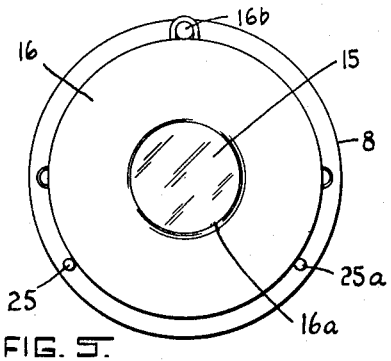
Figure 6:
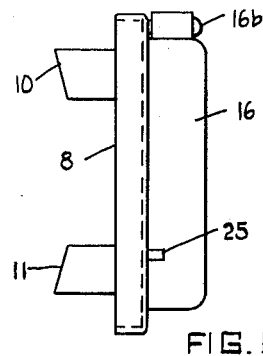
Figure 7:
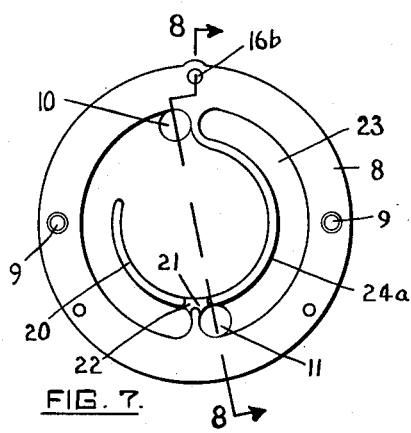
Figure 8:
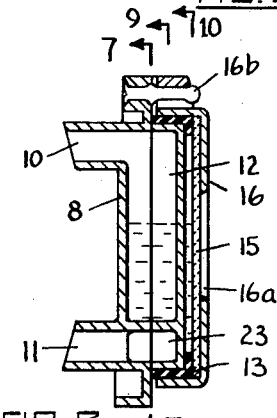
Figure 9:
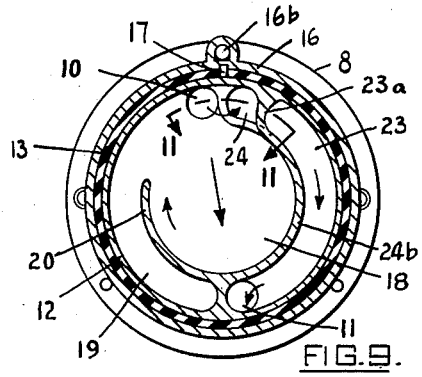
Figure 10:
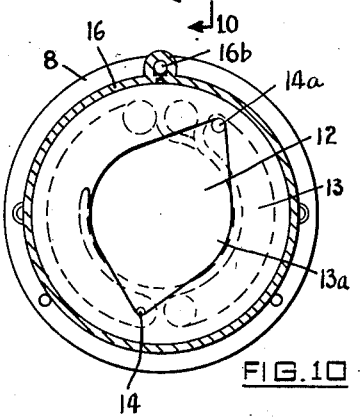
Figure 11:
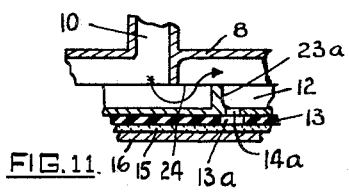

Two proposed forms of the invention will now however be described with reference to the accompanying drawings in which:

Figure 1 is a front elevation of one form of the invention, in which an approximate indication is given as to the rate of flow, the indicator being designed for use in milking machine installations in the manner hereinbefore referred to, Figure 2 is a side elevation thereof, Figure 3 is a front elevation of the body member employed in the construction shown in Figures 1 and 2, Figure 4 is a horizontal cross section on the line 2—2, Figure 3, Figure 5 is a front elevation of an alternative form of the invention, Figure 6 is a side elevation thereof, Figure 7 is a front elevation of the body member employed in the construction shown in Figures 5 and 6, on the line 7—7, Figure 8, Figure 8 is a vertical section through the form of the invention shown in Figures 5 to 7, on the line 8—8, Figure 7, Figure 9 is a section on the line 9—9, Figure 8, showing part of the liquid path, Figure 10 is a section on the line 10—10, Figure 8, showing the sight chamber, and Figure 11 is a part sectional view on the line 11—11, Figure 9.

In the form of the invention shown in Figures 1 to 4, the indicator comprises a main body 1 which can be a metal casting or a plastic moulding, an indicator back plate or closure member 2 which may be a black plastic moulding in order to give an effective contrasting background for the milk in a sight chamber to be hereinafter described, a rubber or the like seal 3, a viewing window 4 made of transparent or translucent material such as glass or clear plastic material and through which the interior of the sight chamber is visible, and an apertured cover or rim member 5 which may be a black plastic moulding with graduations vertically spaced at one or both sides of an aperture therein through which the sight chamber can be viewed.

The window 4 is located within the cover or rim member 5, the rubber or the like seal 3 is assembled over the indicator back plate 2 and the assembly of indicator back plate, seal and window is held in the cover or rim member 5 with the rubber or the like face next to the window. The assembly is supported on the main body 1, a pin 6 being provided on the top of the body and being adapted to be engaged by a loop 6a on the cover for this purpose.

The indicator is designed to indicate, through the viewing window 4, the approximate rate of milk flow coming from the cow, provided that the rate of flow is greater than a predetermined rate of for example about half a pound per minute. Where the flow is less than the predetermined rate the viewing window 4 shows no milk flowing by virtue of the effect of permanent metering orifice or by-pass means to be hereinafter described which allow a predetermined quantity of milk to pass through the indicator without indicating on the viewing window 4, depending on the size of the aperture in the cover 5.

When the milking machine is working, the vacuum is adapted to draw the window 4 into operative position against the seal 3 and the indicator back plate 2 into its operative position against the body member 1, with the flange 3a of the seal located between the back plate 2 and the body member, the assembly forming a substantially leak-free unit.

The interior of the body member 1 is provided with partitions which define various compartments and passages for the milk, two passages being shown at 1c and 1d. The milk passes from a substantially tangentially disposed inlet nipple 1a into the indicator from which it escapes through a substantially tangentially arranged outlet nipple 1b. The said partitions also define a centrifugal separating chamber 1e which is in communication at 1g, 1f and 1j with the milk passage 1d, the nipple 1a leading into its upper part, and the centrifugal separating chamber being provided for substantially separating milk and froth.

The construction is such that the frothy milk is given a rapid rotary motion in the chamber 1e, in the direction of the arrow 1m, and consequently liquid milk substantially free from froth is allowed to accumulate in the form of a pool X behind a baffle 1i forming a baffled space or liquid trap. On entry into the centrifugal separating chamber, when the milk-froth-air mixture changes direction suddenly, a substantial part of the milk froth passes out through the outlet port 1g in the upper part of the centrifugal separating chamber into the milk passage 1d, while liquid milk mixed with some froth passes down into the chamber 1e. The port 1g also forms a milk overflow from the centrifugal separating chamber 1e into the passage 1d.

It will be noted that the port 1g is arranged counter to the direction of rotation of the contents of the separating chamber.

A baffle 1h is provided to guard an upper sight chamber port 2a in the back plate 2 against the admission of froth.

Similarly, the guard baffle 1i is provided at or towards the lower part of the centrifugal separating chamber, above the level of a lower sight chamber port 2b which is below the metering orifice 1f.

The metering orifices 1f and 1j are spaced vertically.

The sight chamber 7 is provided between the window 4 and the back plate 2 and has its sides and top and bottom defined by the inner periphery of an opening in the rubber or the like seal 3 which thus forms the boundary of such sight chamber. The ports 2a and 2b communicate with the top and bottom respectively of the sight chamber.

The indicator is attached in an approximately vertical position in a suitable place between the claw and the milk line, and the body 1 is connected to the said claw and the milk line by the usual rubber tubes which are attached to the nipples 1a and 1b. The milk from the cow passes through the indicator and thence to the milk line.

In operation, after the frothy milk enters the indicator by the milk inlet 1a its direction is changed and the heavy particles of milk are centrifugally flung to the outside wall of the chamber 1e and tend to travel to the bottom of such chamber, light milk froth being sucked out through the port 1g to the milk passage 1d, outlet 1b and from thence into the milk line.

The heavy milk particles form a pool of milk substantially free from froth at X, this pool, adjacent to the port 2b, being substantially guarded by the wall 1i from the pulsating and turbulent conditions in the chamber 1e.

In the flush of the milk flow from each cow, i. e. during the first part of the milking operations, there is a considerable flow of milk through the chamber 1e. Under these conditions, the combined capacities of the orifices 1f and 1j being substantially exceeded by the milk flow from the cow the quantity of milk in the chamber 1e is very considerable, the level in the sight chamber 7, which is correspondingly high, giving an indication of the high rate of milk flow. At this stage the orifices 1f and 1j carry for example about one pound of milk per minute, the rest of the milk passing out with the froth and air through the port 1g.

The variations in the amount of milk in the chamber 1e are in accordance with the well know weir principle, the indication given in the sight chamber being of course only an approximate indication as to the milk flow condition obtaining in the milk passageway within which the indicator is interposed.

When the milk flow falls off toward the end of the milking period, assuming that the flow drops to for example about one pound per minute, the metering orifices 1f and 1j take substantially all of the milk flow, apart from some milk which passes out with the air and froth through the port 1g. Under these conditions, the milk level in the pool X having fallen to the level of the upper orifice 1j, a corresponding level is apparent in the sight chamber which indicates approximately one pound flow of milk per minute.

When the milk flow from the cow falls below for example about half a pound per minute, the milk level in the pool X will fall below the level of the orifice 1j, a corresponding indication being given in the sight chamber, but it will be apparent that when the milk flow is negligible the indicator will not necessarily give any indication of milk flow. This is not considered important in the case of a milking machine installation, because the cups would have been removed from the cow's teats before these conditions are reached.

As the sight chamber has its lower port 2b connected to the pool X in the body member 1 and its upper port 2a located above the guard 1b, when milk is flowing, the level in the chamber 1e is transmitted through the port 2b into the sight chamber where a stable reading is made possible.

Provided that the overflow port 1g is designed with an area as great, or greater than the inside area of the standard milk rubber tubing, no constriction should occur.

By designing the overflow port 1g and port guard 1h in a suitable manner, the jet action of the air-milk-froth mixture can be used to apply a slight negative pressure to the port 2a. This is important as it substantially prevents froth from entering the sight chamber from the top.

At the finish of milking the milking machine has to be cleaned which is usually carried out by leaving the machine running and immersing the teat cups in a bucket of cleaning fluid which may be hot or cold water and may be disinfected. The volume of the flow of cleaning fluid through the machine is usually equal to the full capacity of the tubes from the claw and the dropper milk tube and so the sight chamber will be thoroughly flushed. The flushing is assisted by the previously mentioned negative pressure factor at the top of the sight chamber, cleaning fluid being attracted through the sight chamber to effectively clean the sight chamber as well as the main body 1.

When the milking machine is ultimately stopped and the vacuum ceases, the hanging cover 5 of the indicator hangs slightly free of the main body, which allows any drops of cleaning liquid in the indicator to escape, and allows air to circulate through the indicator when standing. This adds to cleanliness and sterility.

A feature of the method of construction is that the centrifugal separating chamber and the various main liquid passages are partially formed by recessing the face of the body member, the closure member when disposed against the face of the body member completing the said centrifugal separating chamber and the passages.

The centrifugal separating chamber 1e and associated inlet passage 1c and outlet port 1g and the baffle 1i constitute means to separate and substantially free from froth a desired portion of the milk passing through the indicator.

The sight chamber 7 and associated ports 2a and 2b and the metering orifices 1f and 1j constitute means for utilising the separated portion of the milk to indicate visually the state of flow through the indicator.

In the form of the invention shown in Figures 5 to 11, the indicator is not intended to indicate the rate of flow of the milk but is only intended to indicate the state of flow, i. e. to indicate whether or not milk is flowing at a rate exceeding for example about half a pound of milk per minute. We have found in practice that there is however some warning given a little while before it becomes necessary to remove the cups, because a fluctuation in the milk level in the sight chamber occurs when the flow from the cow is falling from about one pound of milk per minute to about half a pound of milk per minute, but it is not intended that this fluctuation in level will actually indicate accurately the rate of flow.

In this form of the invention a substantially circular mounting base or body member 8 is provided, said body member being adapted to be mounted by screws passing through holes 9 in a suitable position in a milking shed, and said body member, which may be made of an appropriate plastic material, having partially formed therein various channels and recesses as will be apparent with reference to Figures 7 and 8 of the drawings, with an inlet 10 and an outlet 11 extending substantially perpendicularly backwards from the body member for attachment in any suitable way to the milk passageway within which the indicator is interposed.

On the front of the body member 8 there is mounted a closure member 12 which together with the member 8 forms a housing and which also has formed therein channels and recesses which register where appropriate with the channels and recesses formed in the body member 8 to form the requisite main passages and centrifugal separating chamber within the indicator.

Around the closure member 12 there is disposed a rubber or the like seal 13 which fits over the closure member 12 and has formed therein an aperture 13a adapted to co-act with ports 14 and 14a in the closure member so as to form a sight chamber similar in function to the sight chamber shown in Figures 1 to 4.

In front of the seal 13 there is provided a window 15 which may be made of any suitable transparent or translucent material such as glass or clear plastic, the window, seal, and closure member being held together by means of a cover or rim member 16 provided with a hole 16a and adapted to freely engage mounting means 16b on the body member, so that the assembly of closure member, seal, window and cover or rim member will hang freely on the body member in a similar manner to the corresponding assembly shown in Figures 1 to 4.

A pin 17 projecting from the closure member 12 and passing through the seal 13 is engageable in a notch in the cover or rim member 16 for the purpose of holding the parts in the proper relative positions.

Referring to Figures 7 to 11, the internal compartments within the indicator comprise a centrifugal separating chamber 18 which is not elongated in a vertical direction as in the construction shown in Figures 1 to 4, but is largely defined by concentric walls, and a protected compartment 19 substantially concentric with the body member and protected by means of a baffle 20 from the conditions obtaining within the centrifugal separating chamber, a metering orifice 21 being provided leading to the outlet 11 from the indicator, and a port 22 being provided communicating between the centrifugal separating chamber 18 and the protected compartment 19. The internal compartments also comprise a curved passage 23 concentric with the body member, with an upper port 24 (Figures 9 and 11) formed by the differential arcuate lengths of the walls 24a and 24b, said port 24 forming in effect an overflow outlet from the centrifugal separating chamber 18 for the purpose of receiving the froth and, during the greater part of the milking cycle, also receiving liquid milk. The said port 24 is adjacent to the inlet 10 into the centrifugal separating chamber and the arrangement is such that in order to pass through the port 24 the frothy milk will require to travel through an angle of about 180 degrees. The positioning of the outlet port 24 as shown provides for the centrifugal action.

The metering orifice 21 is designed to take half a pound per minute of milk without the milk level rising above the said orifice and in operation the said orifice is capable of taking a greater flow than obtains at this stage. We have found that when the flow exceeds one pound per minute from the cow the centrifugal separating chamber and the sight chamber are substantially full, and between a flow of about half a pound of milk per minute and one pound of milk per minute from the cow the quantity of milk within the centrifugal separating chamber 18 and the level behind the baffle 20 and also in the sight chamber will fluctuate.

Referring to Figure 10, the sight chamber has a substantially diamond shape which results in any froth in the sight chamber being expanded as the sight chamber level falls, so that the said froth interferes as little as possible with the reading. The port 14 communicating with the protected compartment behind the baffle 20 is of smaller size than the upper port 14a which is in communication with the curved passage 23, below the baffle 23a, near the upper end thereof.

Two pins 25 and 25a projecting outwards from the body member are employed to enable the assembly of the closure member, seal, window and cover or rim member to be properly aligned onto the body member.

The centrifugal separating chamber 18 and associated inlet 10 and outlet port 24 and the baffle 20 and port 22 constitute means to separate and substantially free from froth a desired portion of the milk passing through the indicator.

The sight chamber and associated ports 14 and 14a and the metering orifice 21 constitute means for utilising the separated portion of the milk to indicate visually the state of flow through the indicator.

The operation of this form of the invention is similar to the operation of the form of the invention shown in Figures 1 to 4, except that no endeavour is made to give varying readings for varying rates of liquid flow beyond for example about one pound per minute.

When the flow from the cow exceeds about one pound per minute, i. e. in the flush of the milking, the milk and froth in excess of about one pound per minute flows out through the overflow port 24 and along the passage 23 to the outlet 11, the metering orifice 21 by-passing a flow of about one pound per minute.

There is a similar action to that obtaining in the construction shown in Figures 1 to 4, in that a great part of the froth is removed from the frothy milk almost immediately upon admission into the centrifugal separating chamber.

When the flow falls to between half a pound per minute and one pound per minute there is a lesser quantity of milk in the centrifugal separating chamber, and the level behind the baffle 20 can vary, althought it will at this stage be above the orifice 21. Froth and some milk passes out through the port 24.

When the flow falls to below half a pound per minute milk entering the centrifugal separating chamber will pass directly through the metering orifice 21 to the outlet, the milk level behind the baffle 20 being below the orifice 21 and no milk being visible in the sight chamber.

In both of the constructions herein described, the design is such that when the milk flow from the cow is normal, i. e. when the flow is sufficient for efficient machine milking, there is a direct indication as to the state of flow in the presence of milk in the visible part of the sight chamber. On the other hand, when the milk flow is so low that the cups should be removed, there is an indication as to the state of flow, in the absence of any appreciable quantity of milk in the visible part of the sight chamber. In either case the state of flow is indicated by presence or substantial absence of milk in the sight chamber.

The metering orifices in both of the constructions described and shown herein, and also the orifice 22 (Figure 7) are formed as notches in the face of the body member, which facilitates moulding of the body member from plastic.

I claim:

1. A liquid flow indicator adapted to be interposed in a passageway for the purpose of indicating the state of flow therethrough of a frothy liquid under a degree of reduced pressure, comprising a housing having outer walls and enclosing a centrifugal separating chamber therein, the said chamber having curved inner walls to assist centrifugal action, said chamber having an inlet near the outer periphery for admitting said frothy liquid from said passageway into said chamber and an outlet near the outer periphery for discharging froth and liquid from said chamber, a housing outlet adapted to receive froth and liquid from the chamber outlet and to discharge it to said passageway, said chamber inlet and chamber outlet being arranged to cause the necessary rotation of the frothy liquid confined by said curved walls and passing through said chamber to facilitate separation of liquid from the froth, a baffle forming part of the curved inner walls defining said chamber and disposed in spaced relation to the outer walls of said housing, said baffle forming a space defined by and between the baffle and an adjacent wall of said housing and adapted to form a liquid trap in a position in said housing to receive, from the contents of the chamber, liquid substantially separated from froth, said inner walls having at least one metering orifice constituted by a port adapted to by-pass liquid from said chamber adjacent said liquid trap and at a controlled rate to the housing outlet, said liquid trap being in liquid communication with said chamber, and means forming a sight chamber disposed adjacent to the centrifugal separating chamber and connected to receive from said liquid trap and to hold, substantially free from turbulence, a quantity of the separated liquid varying according to the rate of the liquid flow through said passageway and increasing when the rate of accumulation of liquid in the separating chamber exceeds the capacity of the said metering orifice, and said sight chamber having a window through which liquid in the sight chamber can be viewed in order to determine the state of flow of liquid through the said passageway.

2. A liquid flow indicator according to claim 1, in which said housing comprises a body member and a closure member, said separating chamber and the liquid trap in the indicator being partially formed by recessing the face of said body member, and said closure member being adapted to be disposed against the recessed face of said body member in order to complete said separating chamber and said trap.

3. A liquid flow indicator according to claim 1, in which said separating chamber, sight chamber and window are elongated substantially vertically to accommodate a sufficient extent of variation in the liquid level in the sight chamber to impart an indication not only of the state of flow but also of the approximate rate of flow within predetermined limits.

4. A liquid flow indicator according to claim 1, in which said separating chamber, sight chamber and window are elongated substantially vertically and said inner walls are provided with a plurality of vertically spaced orifices, said elongated sight chamber and window and said vertically spaced orifices providing for a sufficient extent of visible variation in the liquid level in said sight chamber to give an indication not only of the state of flow but also of the approximate rate of flow within predetermined limits.

5. A liquid flow indicator according to claim 1, in which said inlet for admitting the frothy liquid from said passageway into said separating chamber, and said froth and liquid housing outlet are substantially tangentially arranged in relation to the indicator body.

6. A liquid flow indicator according to claim 1, in which said indicator is substantially circular in shape.

References Cited in the file of this patent

UNITED STATES PATENTS

| Number | Name | Date |
|---|---|---|
| 1,622,715 | Hawxhurst | Mar. 29, 1927 |
| 2,281,512 | Reed | Apr. 28, 1942 |

FOREIGN PATENTS

| Number | Country | Date |
|---|---|---|
| 288,725 | Great Britain | Apr. 16, 1928 |